United States Patent [19]

Wingate

[11] 4,039,826

[45] Aug. 2, 1977

[54] MAGNETIC HEAD LOCATING SYSTEM FOR DISK STORAGE SYSTEM

[75] Inventor: Sidney A. Wingate, Concord, Mass.

[73] Assignee: Dynamics Research Corporation, Wilmington, Mass.

[21] Appl. No.: 671,006

[22] Filed: Mar. 26, 1976

[51] Int. Cl.² .............................................. H01J 3/14
[52] U.S. Cl. .................................. 250/237 G; 250/239
[58] Field of Search .................. 360/78, 106; 250/239, 250/237 R, 237 G, 231 SE, 216; 356/169, 170; 340/347 P

[56] References Cited

U.S. PATENT DOCUMENTS

| | | | |
|---|---|---|---|
| 2,788,519 | 4/1957 | Caldwell | 250/237 G |
| 3,806,254 | 4/1974 | Ha et al. | 356/169 |
| 3,894,232 | 7/1975 | Laspesa | 250/231 SE |

Primary Examiner—David C. Nelms
Attorney, Agent, or Firm—Weingarten, Maxham & Schurgin

[57] ABSTRACT

A linear encoder especially adapted for location of the position of a magnetic read/write head of a disk memory system and having a modular light source and modular detector each easily replaceable and adjustable. The modularity of construction allows use of the encoder in other measuring systems of different mechanical configurations.

10 Claims, 5 Drawing Figures

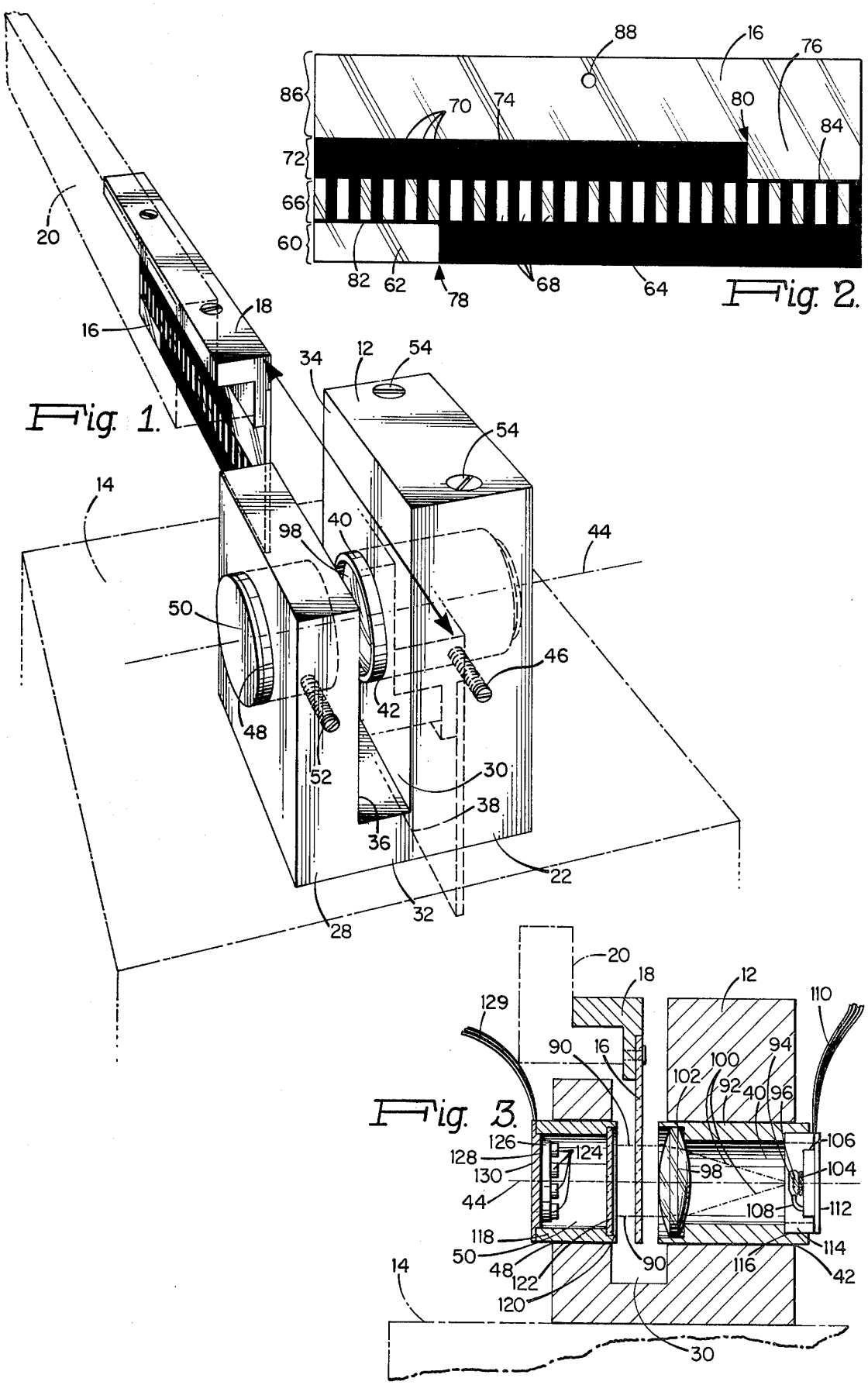

MAGNETIC HEAD LOCATING SYSTEM FOR DISK STORAGE SYSTEM

FIELD OF THE INVENTION

This invention relates to encoder systems for the read/write heads of disk storing systems, and more particularly to encoder positioning systems having modularly replaceable light sources and detectors.

BACKGROUND OF THE INVENTION

In disk storage systems, the read/write head must be accurately positioned over a particular track of the magnetic disk within very precise limits. Recently, encoder-type systems have been used to accurately locate disk recording heads. Due to the accuracy required from these encoder systems, the alignment of the components thereof is extremely critical, accuracies of 200 microinches and repeatabilities of 50 microinches frequently being required. Replacement of the components in such encoder systems is periodically necessary due to burning out of the encoder light source or other malfunctions. Present encoder systems used with disk storage systems have a single illumination/detector assembly to maintain proper alignment, and the entire system must be returned to the manufacturer for replacement thereof. This is inconvenient and costly due to both the expense of repair and the loss of use of the disk storage system during the period of repair.

SUMMARY OF THE INVENTION

In accordance with the invention, an encoder positioning system is described for accurately locating the read/write head of a disk storage system containing an encoder light source and detector which may be changed in the field and aligned without requiring complicated procedures or equipment. Briefly, the invention includes a lamp module having a structure which results in low production costs and which may be easily aligned within a corresponding lamp module mounting hole located within a housing fixedly attached to the disk storage system, and also includes a detector module having similar advantages and similarly locatable within a lamp module mounting hole. The lamp and detector modules are cooperative with their respective mounting means to produce an encoder system in which the components thereof are easily and quickly aligned.

DESCRIPTION OF THE DRAWINGS

The invention will be more fully understood from the following detailed description taken in conjunction with the accompanying drawings in which:

FIG. 1 is a pictorial view of the encoder positioning system;

FIG. 2 is a detailed drawing of the encoder scale; and

FIG. 3 is a cutaway drawing showing further details of the lamp module and the detector module.

DETAILED DESCRIPTION OF THE INVENTION

Figure 4:
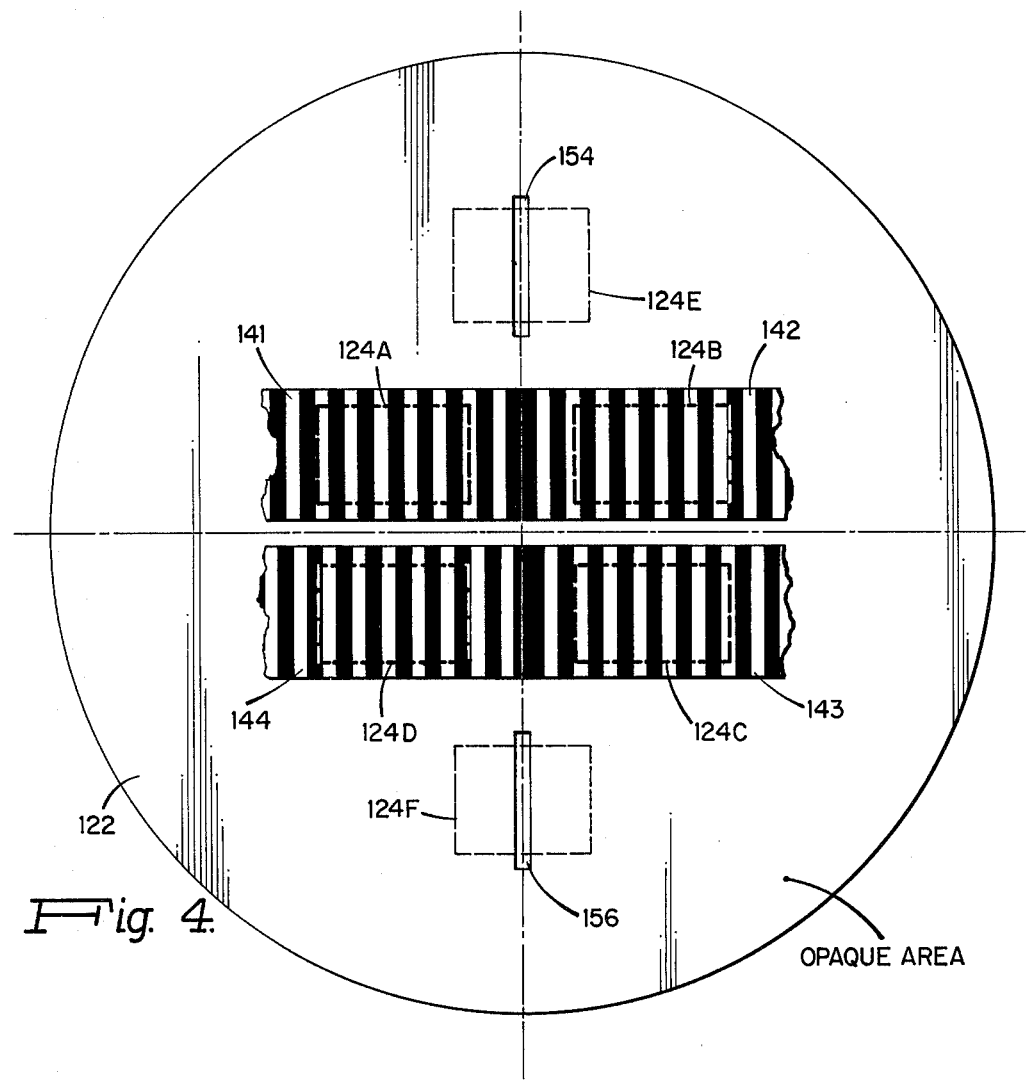
FIGS. 4 and 4A show details of a reticle for use in the detector module.

Referring to FIG. 1, a system for locating a read/write head in a disk-type of data storage system is shown as it appears in use. A mounting block 12 containing the encoder photodetector circuitry is mounted to a part of the disk chassis which is stationary with respect to the rotating disk storage medium, not shown here. As is well known, a magnetic head moves transversely across the surface of the rotating disk, detecting digital data stored magnetically thereupon. An encoder scale 16 attached to a mounting spar 18 is mounted upon the movable arm 20 to which the read/write head is attached and which moves transversely with the read/write head as the head traverses the disk. Thus, encoder scale assembly 16 will move with respect to housing block 12 as the read/write head traverses the magnetic disk.

Housing block 12 is composed of a right-hand section 22 and a left-hand section 28 which are separated by a slot 30 which is formed within housing block 12 as shown. At the base of housing block 12 where it is in contact with the disk chassis 14, right-hand part 22 and left-hand part 28 of housing block 12 are connected by an intermediate part 32 of housing block 12 which remains after slot 30 has been formed. Slot 30 creates two parallel and opposing faces 34 and 36 within housing block 12. The locations of housing block 12 and encoding scale 16 are such that encoder scale 16 passes through slot 30 between opposing faces 34 and 36 as the read/write head attached to arm 20 traverses the magnetic disk. The path of encoder scale 16 through slot 30 is shown in FIG. 1 by doted lines 38. In normal operation, the relative positioning of encoder scale 16 and housing block 12 is such that at least part of encoder sale 16 remains within slot 30 at all times and for all positions of the read/write head, although this is not shown in FIG. 1 for purposes of clarity.

Contained within the right-hand section 22 of housing block 12 is a lamp module 40. Lamp module 40 is of a cylindrical shape and is disposed within a corresponding cylindrically-shaped mounting hole 42 in housing block 12. A typical dimension for the diameter of mounting hole 42 is 0.625 inches. The axis 44 of mounting hole 42 is at right angles to opposing faces 34 and 36. Axis 44 is further located such that it passes through the proper portion of encoder scale 16, as explained below, as encoder scale 16 moves along path 38 within slot 30.

The dimensions of lamp module 40 and lamp module mounting hole 42 are precisely controlled so that lamp module 40 is a very close fit within mounting hole 42. Thus, lamp module 40 is free to move longitudinally within mounting hole 42 in a direction parallel to axis 44 and perpendicular to opposing faces 34 and 36 and is also free to rotate about axis 44. In this manner, the lengthwise dimension of lamp module 42 is kept precisely aligned at right angles to opposing faces 34 and 36 during alignment of lamp module 40, as described below, by means of longitudinal movements along and axis rotations about axis 44. Tapped hole 46, extending from the outside of housing block 12 through the wall of mounting hole 42, allows lamp module 40 to be maintained in one particular position by means of a set screw after the lamp module has been aligned.

Located within left-hand section 28 of housing block 12 and extending from the outside of housing block 12 through face 36 of slot 30 is a detector module mounting hole 48 axially centered about the same axis 44 as lamp module mounting hole 42. Similarly to the lamp module 40, cylindrical detector module 50 fits precisely within mounting hole 48, allowing rotational and longitudinal movements of detector 50 within mounting hole 48, while maintaining the lengthwise axis of detector module 50 precisely aligned with that of lamp module 40. A corresponding tapped hole 52 for maintaining the position of detector module 50 by means of a set screw extends from the outside of housing block 12 through the wall of detector module mounting hole 48.

As will become apparent below, the length of lamp module 40 along axis 44 usually exceeds the length of detector module 50 along the same axis 44. Accordingly, right-hand section 22 of housing block 12 may be longer in a direction parallel to axis 44 than left-hand section 28, as shown in FIG. 1. Mounting holes 54 may extend from the top surface of right-hand section 22 through to the bottom of the housing block 12 for purposes of securely mounting the housing block to disk chassis 14. Alternately, housing block 12 may be fastened to chassis 14 through holes located elsewhere therein, or by other means.

FIG. 2 is a drawing showing encoder scale 16 in greater detail. Encoder systems and the fabrication of encoder scales suitable for use therewith are well known in the art, and those details and characteristics of encoder scale 16 which are well known are not explained below. Encoder scale 16 is fabricated from a transparent material, typically glass. An appropriate material is disposed upon the glass in such a manner that those parts of the glass upon which the material has been disposed become substantially opaque to visible light. The material is disposed upon the glass so as to create patterns of transmitting and non-transmitting areas which can be used in conjunction with a light source and one or more photosensitive elements to detect and measure movement of the encoder scale.

The encoder scale 16 of FIG. 2 is divided horizontally into four principal sections. The bottom-most section 60 has a horizontally ranging transmissive area 62 located at the left-hand side of encoder scale 16. An opaque area 64 exends from transmissive area 62 to the right-most edge of encoder scale 16 and is of a length greater than half the length of encoder scale 16.

The horizontally ranging section 66 immediately above bottom-most section 60 is composed of alternating transmissive areas 68 and opaque areas 70 very closely spaced and precisely positioned to form an incremental encoder pattern of a type well known to those in the art. Typical dimensions for the width of transmissive areas 68 and opaque areas 70 of incremental pattern 66 would be 0.0025 inches. The vertical dimensions of incremental pattern 66 would typically be 0.2 inches.

Above incremental encoder 66 is a horizontally ranging section 72 similar to area 69 but transposed from left to right. Accordingly, section 72 has an opaque area 74 extending from the left-most edge of encoder scale 16 for a distance exceeding half the length of encoder scale 16. Transmissive area 76 extends from the left-hand edge of opaque area 74 to the right-most edge of encoder scale 16.

Sections 60 and 72 are used in producing "beginning-of-scale" and "end-of-scale" signals as the disk read/write head traverses the magnetic disk. For example, to produce a beginning-of-scale signal, a photodetector is illuminated by light shining through section 60 of encoder scale 16. The light illuminating section 60 is located such that when the read/write head reaches the beginning of scale point, the light is exactly at the boundary 78 between transmissive area 62 and opaque area 64. This boundary 78 is precisely aligned with the alternating opaque and transmissive areas 68 and 70 of incremental pattern 66 so that the magnetic read/write head can be precisely located over the first track on the magnetic recording disk.

Similarly, section 72 is illuminated by a light source and is used to produce the end-of-scale signal. This light source is located such that when the read/write head is at the end-of-scale position, the light source is located at the boundary 80 between transmissive area 76 and opaque area 74. Boundary 80 is precisely aligned with respect to the light and opaque areas 68 and 70 of incremental pattern 66, such that signals therefrom in conjunction with the end-of-scale signal can be used to precisely align the read/write head over the last track of the magnetic recording disk.

Accordingly, the horizontal length of encoder scale 16 over which opaque areas 74 and 64 overlap, corresponds with the active area of the magnetic recording disk upon which data may be stored. Typically, this area of overlap between opaque areas 64 and 74 is approximately 2 inches long.

Located along the boundaries between incremental encoder area 66 and transmissive areas 62 and 76 are opaque areas 82 and 84 which are horizontal extensions of opaque areas 64 and 74 of very narrow width relative to transmissive areas 62 and 76. The purpose of these opaque areas 82 and 84 is to prevent the beginning-of-scale and end-of-scale photodetectors which receive light through transmissive areas 62 and 76, from being inadvertently illuminated by the light source illuminating the light and dark areas 68 and 70 of encoder scale 16 and the photodetectors associated therewith.

The top-most area 86 of encoder scale 16 provides a surface by which encoder scale 16 may be mounted onto mounting spar 18. Although shown as transmissive in FIG. 2, the optical characteristics of area 86 are unimportant. Mounting block 18 is typically metallic in composition, aluminum being a material frequently used. Due to the different temperature coefficients of the glass material used in fabricating encoder scale 16 and the aluminum of other material from which mounting block 18 is formed, mounting block 18 and encoder scale 16 expand at different rates in response to changes in temperature. While these differences in expansion are very small, they may be large enough to deleteriously affect the accuracy with which the disk read/write head can be precisely and accurately relocated over a particular magnetic track of the recording disk. In order to minimize these errors caused by differentials in thermal expansion, encoder scale 16 is fixedly attached to mounting block 18 at a single location, which might typically be midway between the beginning-of-scale boundary 78 and end-of-scale boundary 80 on encoder scale 16. This fixed attachment may be accomplished by means of a bolt or locating pin through hole 88 in encoder scale 16. Alternately, the midpoint may be fixedly attached to mounting block 18 with an epoxy-type glue or other rigid means of attachment. Encoder scale 16 may be further fastened to mounting block 18 elsewhere along its length by means of adhesives applied to area 86, these adhesives being chosen so that they are flexible enough to allow relative movement between encoder scale 16 and mounting block 18 due to differential thermal expansion.

FIG. 3 is a side view of the encoder system of FIG. 1 showing further details of lamp module assembly 40. As shown in FIG. 1, lamp module 40 is mounted with cylindrical hole 42 in housing block 12. Across slot 30 and facing lamp module 42 is detector module 50 located in cylindrical hole 48 within housing block 12. Encoder scale 16 moves within slot 30, intersecting parallel light rays 90 emitted from lamp module 42 and causing different patterns of light to impinge upon detector module 50 in accordance with the position of encoder scale 16.

Lamp module 40 includes tubular lamp housing 92 which fits within lamp module mounting hole 42 and which serves to structurally support the remaining components of lamp module 40. Light bulb 94, containing a filament 96, is located within lamp housing 92 so that the filament 96 intercepts the axis 44 of lamp module mounting hole 40. Light bulb 94 emits light rays which pass through the center of tubular lamp housing 92 and impinge upon collimating lens 98, as exemplified by dashed lines 100. The filament 96 is located at the focal point of collimating lens 98 to produce the parallel light rays 90 emerging therefrom and passing through encoder scale 16. Lens 98 would typically have a diameter of approximately 0.5 inches and a focal length of approximately 0.5 inches. A step 102 in the end of lamp housing 92 serves to locate collimating lens 98 therein. Lens 98 may be securely fastened to lamp housing 92 with an adhesive, a retaining ring, or by other means.

Light bulb 94 is attached by cement 104 to a lamp board 106. Conductors 108 from light bulb 94 are attached to lamp board 106, and flex circuit 110, having two conductors therein, is also attached to lamp board 106. Power for light bulb 94 flowing through the conductors of flex circuit 110 flows through conductors on lamp board 106 and thence wires 108 to filament 96. Lamp board 106 is fastened to an end cap 112. End cap 112 is attached to a spacer 114 which fits within a cylindrical slot 116 in the end of lamp housing 92 and securely locates light bulb 94 and filament 96 at the proper location within lamp housing 92 and with respect to collimating lens 98.

The particular method of mounting light bulb 94 within lamp module 40 shown in FIG. 3 has been found to have several advantages. To achieve the best collimation by lens 98 so as to produce parallel light rays 90, the light source located at the focal point of collimating lens 98 should approximate a point light source as closely as practicable. Because of this, light bulb 94 is typically extremely tiny. Furthermore, filament 96 of light bulb 94 should be oriented such that its maximum dimension in a direction perpendicular to axis 44 is exactly parallel with the alternating light and dark areas 68 and 70 and the boundaries 78 and 80 of encoder scale 16. The mounting arrangement for light bulb 94 shown in FIG. 3 allows power to be conducted to lamp module 40 via flex leads 110 which can be conveniently connected to terminals providing the power and which have adequate durability to maintain their structural integrity. The wires 108, forming the terminals of light bulb 94, are extremely small and delicate and are easily broken. In the mounting structure of FIG. 3, these wires need only run a short distance from light bulb 94 to lamp board 106. Light bulb 94 can be precisely located so that filament 96 passes through axis 44 at the center of lamp module 40 and cemented in place, after which wires 108 may be easily connected to lamp board 106. Alternatively, instead of light bulb 94, a light emitting diode or other source of light could be used, the light source being positioned as described aboe so that the light therefrom is properly collimated by lens 98. Upon inserting lamp module 40 into lamp module mounting hole 42, the entire lamp module assembly may be rotated within mounting hole 42 until filament 96 is oriented parallel to the markings on encoder scale 16, as indicated by a maximum output from the photodetector module 50.

Lamp module 40 has the further advantage that it may be used in different disk storage systems having different configurations and requiring different housing blocks 12. Since only one lamp module type need be manufactured instead of several different types, production costs will be lower. Additionally, since many more of the same type of lamp module are manufactured than would be the case if many different lamp modules were required, more economical production methods may be used which are only practical where large numbers of an item are produced. For example, lamp housing 40 may be a molded plastic part rather than being machined from a metal tube.

Lamp module 40 may require periodic replacement due to any of several causes. Most commonly, light bulb 94 will burn out. Another frequent cause of replacement for lamp module 40 is blackening of the inside of the glass of light bulb 94 by metal evaporated from the filament 96. Also, the lamp may be inadvertently burned out by the application of too high a voltage. It will be appreciated that when replacement of lamp module 40 is necessitated by these or other circumstances, a structure which allows the rapid and simple replacement of the lamp module would be useful. Previous methods of constructing the source of illumination for encoder scale 16 have made the replacement and proper alignment of light bulb 94 extremely difficult. The method of the invention for locating lamp module 40 allows the source of illumination for encoder scale to be easily replaced.

Due to the manner in which light bulb 94 is located, there are very small but unavoidable differences in the relative positioning of collimating lens 98 and filament 96 between otherwise identical lamp module units. Because of these differences, small adjustments must be made in the longitudinal and rotational placement of lamp module 40 with respect to housing block 12. By originally calibrating each individual lamp module 40 in a master fixture corresponding to housing block 12, the optimum location of lamp module 40 with respect to housing block 12 can be determined. The rotational position of lamp module 40 can easily be indicated, for example, by placing a scribe mark upon lamp module 40, upon the outside face of end cap 112. By making this scribe in accordance with an index line which is located upon the master fixture and which corresponds with similarly located index marks upon other housing blocks 12, a lamp module 40 may quickly and easily be optimally aligned within any housing block. Similarly, the optimum longitudinal location along axis 44 may be indicated with a scribe mark; however, the longitudinal location of lamp module 40 is much less critical than the rotational position, and this method for precise location may not be required.

Similarly to lamp module 40, photodetector 50 is mounted within cylindrical hole 48 in housing block 12, across slot 30 from and facing lamp module 40. Detector module 50 includes a tubular detector housing 118 which fits within detector module mounting hole 48 and which serves to structurally support the remaining components of detector module 50. A step 120 formed in the end of detector housing 118 serves to locate a reticle 122 therein. Reticle 122 may be securely fastened to detector housing 118 with an adhesive, a retaining ring, or by other means. Located behind reticle 122 are photodetectors 124 for detecting light from lamp module 40 which passes through encoder scale 16 and then through reticle 122, indicating the position of encoder scale 16 and thereby the position of the read/write head. The arrangement and purpose of each of the photodetectors 124 is explained in further detail below. Photodetectors 124 are mounted on a detector board 126 which in turn is connected to a multi-conductor flex circuit 128 which conducts along leads 129 from detector module 50 the signals from photodectors 124. The subassembly consisting of photodetectors 124, detector board 126, and flex circuit 128 is attached to an end cap 130 which serves to support the photodetector subassembly and securely locate it within detector housing 118.

Similarly to lamp module 40, the rotational and longitudinal positioning of detector module 50 about axis 44 is critical to the proper operation of the encoder system. In the same manner as described above for lamp module 40, the optimal rotational position for detector module 50 can be determined using a master fixture. This optimal position of detector module 50 can then be indicated by a scribe mark. By lining up this scribe mark with a corresponding scribe mark on housing 12, any detector module 50 may be properly rotationally aligned within any housing block 12.

The longitudinal positioning of detector module 50 along axis 44 is more critical for the detector module than for lamp module 40. The critical dimension in the longitudinal position of detector module 50 is the distance between reticle 122 and encoder scale 16. This distance, and thus the longitudinal position of detector module 50, is best set by placing a spacer of the proper thickness between encoder scale 16 and the adjacent end of detector housing 120 to accurately fix the distance between encoder scale 16 and reticle 122. Detector module 50 may then be securely maintained at this position by means of a set screw in set screw hole 52.

Figure 4A:
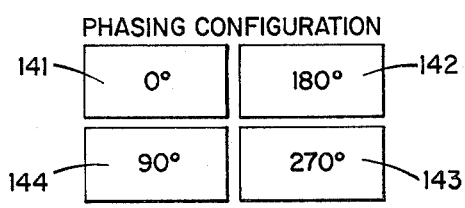

Referring to FIG. 4, a front view of reticle 122 is shown. Reticle 122 is circular and has four patterns 141, 142, 143 and 144 symmetrically located about its center as shown. These reticle patterns are composed of alternating transmissive and opaque areas similar to and having the same widths as those of incremental encoder 66. Although not clearly shown in FIG. 4, the relative phasing of each of the reticle patterns 141–144 is as shown in FIG. 4A. Located behind each of the reticle patterns 141–144 is a corresponding photodetector 124A–124D, shown in dotted lines. Each of the four reticle patterns 141–144 is located such that light from lamp module 40 passing through incremental pattern 66 falls upon each of the reticle patterns 141–144.

The output of each of the photodetectors 124A–124D is determined both by the position of the incremental pattern 66 on encoder scale 16 and by the phasing of the corresponding reticle patterns 141–144 behind which the photocell is located. By means of electronic circuits well known in the art, the outputs of photodetector 124A and photodetector 124B, respectively illuminated by light passing through reticle pattern 141 and reticle pattern 142, which are 180° out-of-phase, can be combined to produce a signal representative of the position of encoder scale 16. In a similar manner, a second signal can be produced from the outputs of photocells 124C and 124D, which output will also be representative of the position of encoder scale 16. Due to the 90° difference in the phasing of reticle patterns 141 and 142 with respect to reticle patterns 144 and 143, this second signal will be in a quadrature relationship with the first signal. Using methods well known to those in the art, these quadrature signals can be processed to produce signals indicative of the position of encoder scale 16.

Although not shown in FIG. 4, the entire remainder of reticle 122 outside of the encoder scales 140–146 is opaque with the exception of two transparent slits 154 and 156. Located behind slits 154 and 156 are corresponding photodetectors 124E and 124F. Slit 156 is located such that light from lamp module 40 falling thereupon must pass through section 60 of encoder scale 16 so that photodetector 124F produces the "beginning-of-scale" signal. Similarly, slit 154 is located so that light falling thereupon from lamp module 140 must pass through section 72 of encoder scale 16 such that photodetector 124E produces the "end-of-scale" signal.

It should be appreciated that additions and modifications to the preferred embodiment described herein may be made by those skilled in the art without departing from the scope of the invention. Accordingly, the invention is to be limited only as indicated in the appended claims.

What is claimed is:

1. In a system with a first member moving in a linear path with respect to a second member, an encoder system for locating the relative position between the members, comprising:

a scale having an encoder pattern thereupon;
means for mounting the scale;
means for illuminating the encoder pattern;
a cylindrical housing within which the illuminating means is mounted;
means for detecting illumination;
a second cylindrical housing within which the detecting means is mounted;
means for positioning the illuminating means such that the illuminating means is rotatable about and movable longitudinally along the cylindrical axis of the illuminating means housing for alignment thereof;
the means for mounting the encoder scale and the means for positioning the illuminating means being operative to position the encoder scale and the illuminating means so that the relative movement therebetween corresponds with the relative movement between the two members; and
means for positioning the detector means such that the detector means is rotatable about and movable longitudinally along the cylindrical axis of the detecting means for alignment thereof and such that light from the illuminating means which passes through the encoder pattern impinges upon the detecting means.

2. The system of claim 1 wherein the illumination means is positioned so that the parallel rays of light therefrom pass through and are perpendicular to the encoder pattern; and wherein the detector means is positioned such that the axis of the detector means housing is colinear with the axis of the illumination means housing.

3. The system of claim 2 wherein the illuminating means housing is tubular;

and wherein the illuminating means includes:
a collimating lense mounted within the tubular housing;
a light source; and
means for positioning the light source within the tubular housing at the focal point of the collimating lens so as to produce substantially parallel rays of light from the illuminating means.

4. The system of claim 3 wherein the detector means housing is tubular;

and wherein the detector means includes:
- a reticle corresponding with the encoder pattern upon the encoder scale;
- at least one photodetector means for detecting light passing through the reticle; and
- means for positioning the photodetector means within the detector means housing behind the reticle.

5. The system of claim 4 further including:
- a first index marking upon the means for positioning the illuminating means;
- a second index marking upon the means for positioning the detector means;
- a third index marking upon the illumination means which when properly located with respect to the first index marking causes the angular position of the illuminating means about the illumination means housing axis to be properly aligned; and
- a fourth index marking upon the detector means which when properly located with respect to the second index marking causes the angular position of the detector means about the detector means housing axis to be properly aligned.

6. The system of claim 5 wherein:
- the encoder scale further includes two additional sections thereupon, each additional section having one opaque and one light transmissive area, the boundaries therebetween serving to denote beginning-of-scale and end-of-scale positions;
- the two additional sections and the illumination means are constructed and positioned so that light from the illuminating means passes through each of the additional sections and impinges upon the detector means;
- the reticle further includes additional transmissive areas through which light passing through the two additional sections may pass; and
- the detector means further includes photodetector means disposed behind the additional reticle transmissive areas for detecting light passing therethrough to produce beginning-of-scale and end-of-scale signals.

7. The system of claim 6 wherein the means for mounting the light source further comprises:
- a sleeve which fits within the illumination means housing;
- an end cap closing off one end of the sleeve;
- a flexible printed circuit passing through the sleeve and attached to the inside of the end cap such that the conductors thereof are exposed for conducting power to the light source; and
- a lampboard to which the light source is attached, and to which electrical terminals from the light source are electrically connected, the lampboard being mounted upon that part of the flexible printed circuit attached to the end cap and being operative to connect the light source terminals with the exposed conductors of the flexible printed circuit.

8. The system of claim 7 wherein the encoder scale is fixedly attached to the mounting means at a single location corresponding to the point in the scale through which light from the illumination passes when the first member is midway along its range of movement.

9. An encoder system for detecting relative movement between two structures including:
- an encoder scale having an encoder pattern thereupon mounted in a fixed relationship with the first structure;
- means for illuminating the encoder scale;
- a cylindrical housing within which the illuminating means is mounted;
- means for detecting illumination;
- a second cylindrical housing within which the detecting means is mounted;
- means for positioning the illuminating means in a fixed relationship with the second structure such that the illumination means is rotatable about and movble longitudinally along the axis of the illumination means housing for alignment thereof; and
- means for positioning the detector means such that light from the illumination means which passes through the encoder pattern impinges upon the detector means;
- a replaceable source of encoder illumination, comprising:
  - a cylindrical housing;
  - a collimating lens mounted within the cylindrical housing;
  - a light source; and
  - means for positioning the light source within the tubular housing at the focal point of the collimating lens so as to produce substantially parallel rays of light from the source of illumination.

10. In a magnetic disk memory system, an encoder system for locating the magnetic read/write head, comprising:
- an encoder scale having an encoder pattern thereupon;
- means for mounting the scale in a fixed relationship with the magnetic recording head;
- means for illuminating the encoder scale, including a cylindrical housing;
- means for detecting illumination, including a second cylindrical housing;
- means for positioning the illuminating means in a fixed relationship to the magnetic disk such that the illumination means is rotatable about and movable longitudinally along the cylindrical axis of the illuminating means housing for alignment thereof; and
- means for positioning the detector means such that the detector means is rotatable about and movable longitudinally along the cylindrical axis of the detector means housing for alignment thereof and such that light from the illumination means which passes through the encoder pattern impinges upon the detector means.

* * * * *